(12) United States Patent
Hu et al.

(10) Patent No.: US 12,406,155 B1
(45) Date of Patent: Sep. 2, 2025

(54) METHOD AND SYSTEM FOR OBTAINING DIRECT FEEDBACK FROM INTERACTIVE PASSIVE RFID CARD

(71) Applicant: JPMorgan Chase Bank, N.A., New York, NY (US)

(72) Inventors: Shaohan Hu, Yorktown Heights, NY (US); Youngwook Do, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/741,202

(22) Filed: Jun. 12, 2024

(51) Int. Cl.
 *G06K 7/10* (2006.01)

(52) U.S. Cl.
 CPC ................. *G06K 7/10366* (2013.01)

(58) Field of Classification Search
 CPC .................................................. G06K 7/10366
 See application file for complete search history.

(56) References Cited

U.S. PATENT DOCUMENTS

2007/0273518 A1* 11/2007 Lupoli .................. G06F 16/211
340/572.1
2008/0054077 A1* 3/2008 Zellner ............ G06K 19/07345
235/492
2014/0380452 A1* 12/2014 Suwald ..................... G07F 7/08
726/9

OTHER PUBLICATIONS

International Search Report dated Apr. 22, 2025 issued in International Patent Application No. PCT/US2025/021490.
Written Opinion dated Apr. 22, 2025 issued in International Patent Application No. PCT/US2025/021490.

* cited by examiner

*Primary Examiner* — Jamara A Franklin
(74) *Attorney, Agent, or Firm* — GREENBLUM & BERNSTEIN, P.L.C.

(57) ABSTRACT

Method and systems for obtaining direct feedback from a payment card by using energy received from a radio frequency identification (RFID) card reader is provided. The method is implemented by a processor that is embedded in the payment card. The method includes: receiving, from the RFID card reader, a radio frequency (RF) signal that relates to a proposed transaction; transmitting, to the RFID card reader, account information that relates to the proposed transaction; and causing an actuator that is embedded in the payment card to actuate a feedback action based on the RF signal. The actuator may include a haptic device that generates a vibration that is detectable by a touch of a user of the payment card.

17 Claims, 4 Drawing Sheets

METHOD AND SYSTEM FOR OBTAINING DIRECT FEEDBACK FROM INTERACTIVE PASSIVE RFID CARD

BACKGROUND

1. Field of the Disclosure

This technology relates to methods and systems for obtaining direct feedback from a passive radio frequency identification (RFID) card by using energy received from a passive RFID card reader.

2. Background Information

Conventional payment cards, such as charge cards, credit cards, and debit cards, are capable of wirelessly interacting with card readers by using various techniques such as swiping the card through a slot in the card reader or inserting the card into the reader in a manner that enables information to be communicated between the card and the card reader. In this aspect, it is typical that the card reader may be able to provide feedback, such as by displaying a message that relates to a transaction being executed by using the card and the card reader.

Generally, it is not possible to obtain feedback directly from the card itself, unless the card is equipped with an independent power source, such as a battery, that is large enough to generate sufficient power to provide such feedback. This is typically not feasible for logistical reasons, such as the size and shape of the card and/or a design preference that the card should be easy for a user to carry and manipulate by storing it in a wallet or other convenient conveyance.

However, such a card, such as an RFID card, typically does include a mechanism for receiving sufficient energy to enable the card to communicate with the card reader. As a result, although this amount of energy is relatively small, it would be advantageous to enable a passive card to make use of such energy to provide direct feedback without embedding a battery into the card.

Accordingly, there is a need for obtaining direct feedback from a passive radio frequency identification (RFID) card by using energy received from a passive RFID card reader.

SUMMARY

The present disclosure, through one or more of its various aspects, embodiments, and/or specific features or sub-components, provides, inter alia, various systems, servers, devices, methods, media, programs, and platforms for obtaining direct feedback from a passive RFID card by using energy received from a passive RFID card reader.

According to an aspect of the present disclosure, a payment card is provided. The payment card includes: a processor; a communication interface coupled to the processor and configured to facilitate wireless communication with a radio frequency identification (RFID) card reader; and an actuator configured to generate feedback. The processor is configured to: receive, from the RFID card reader via the communication interface, a radio frequency (RF) signal that relates to a proposed transaction; and cause the actuator to actuate a first feedback action based on the first RF signal.

The processor may be further configured to transmit, to the RFID card reader via the communication interface, account information that relates to the proposed transaction.

The processor may be embedded in a power circuit board that includes a capacitor configured to store the energy associated with the RF signal that is received from the RFID card reader.

The actuator may include a haptic device. The first feedback action may include a vibration that is detectable by a touch of a user of the payment card.

Alternatively, the actuator may include a light-emitting diode (LED) device, and the first feedback action may include an emission of light that is visible to a user of the payment card.

As another alternative, the actuator may include a speaker device, and the first feedback action may include an emission of sound that is audible to a user of the payment card.

As yet another alternative, the actuator may include a heater, and the first feedback action may include a change of a color of a portion of the payment card that is visible to a user of the payment card.

The actuator may include an electromechanical actuator that requires a direct current (DC) source.

The payment card may further include: a voltage multiplier configured to amplify the RF signal by a predetermined factor; and a voltage regulator configured to transfer the amplified signal from the voltage multiplier to the electromechanical actuator.

Alternatively, the actuator may include a linear resonance actuator that requires an alternating current (AC) source.

The payment card may further include: a voltage multiplier configured to amplify the RF signal by a predetermined factor; a voltage regulator configured to receive the amplified signal from the voltage multiplier and to regulate a voltage of the amplified signal; and a pulse-width modulator configured to modulate the amplified and voltage-regulated signal and to transfer the modulated signal to the linear resonance actuator.

According to another aspect of the present disclosure, a method for obtaining direct feedback from a payment card is provided. The method is implemented by a processor that is embedded in the payment card. The method includes: receiving, from an RFID card reader via the communication interface, a RF signal that includes first information that relates to a proposed transaction; and causing an actuator that is embedded in the payment card to actuate a first feedback action based on the RF signal.

The method may further include transmitting, to the RFID card reader, account information that relates to the proposed transaction.

The processor may be embedded in a power circuit board that is embedded in the payment card and that includes a capacitor configured to store the energy associated with the RF signal that is received from the RFID card reader.

The actuator may include a haptic device. The first feedback action may include a vibration that is detectable by a touch of a user of the payment card.

Alternatively, the actuator may include a light-emitting diode (LED) device, and the first feedback action may include an emission of light that is visible to a user of the payment card.

As another alternative, the actuator may include a speaker device, and the first feedback action may include an emission of sound that is audible to a user of the payment card.

As yet another alternative, the actuator may include a heater, and the first feedback action may include a change of a color of a portion of the payment card that is visible to a user of the payment card.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

Figure 1:
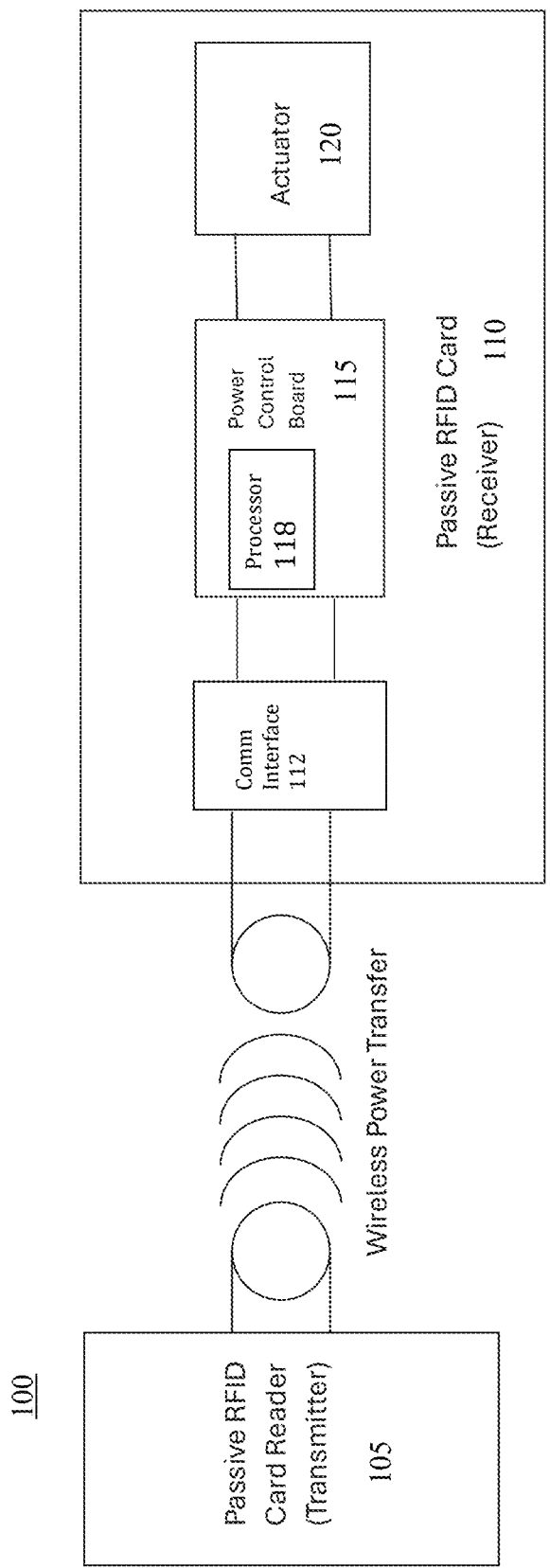
FIG. 1 is a component diagram that illustrates a first approach for implementing a method for obtaining direct feedback from an RFID card by using energy received from a passive RFID card reader, according to an exemplary embodiment.

FIG. 1 is a component diagram 100 that illustrates a first approach for implementing a method for obtaining direct feedback from an RFID card by using energy received from a passive RFID card reader, according to an exemplary embodiment. As shown in FIG. 1, a passive RFID card reader 105 may be configured to communicate wirelessly with a passive RFID card 110 in a manner that effects a wireless power transfer between the two devices. In an exemplary embodiment, the RFID card 110 includes a communication interface 112; a power control board 115 within which a processor 118, such as a microprocessor chip, may be embedded; and the RFID card 110 also includes an actuator 120. In an exemplary embodiment, the power control board 115 may also include a capacitor that is configured to store energy associated with the wireless power transfer that is received from the RFID card reader 105.

In an exemplary embodiment, the communication interface 112 may be any type of interface device that is configured to facilitate wireless transmission and reception of radio-frequency (RF) signals that may be carrying information. The processor 118 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device.

In an exemplary embodiment, the first approach for implementing a method for obtaining direct feedback from the RFID card 110 by using energy received from the passive RFID card reader 105 entails using power/energy that is transferred directly to the actuator 120, i.e., energy-harvesting. Because the power is directly applied to the actuator, in an exemplary embodiment, the voltage may be limited to a relatively low value of approximately 2.5 volts or less. In this aspect, the actuator 120 may need to be of a type that only requires such a relatively low voltage value in order to operate. However, in another embodiment, when a sufficient amount of energy is harvested and directly applicable to the actuator, the voltage that corresponds to the energy harvesting may be greater than 2.5 volts, or any other voltage value that may be generated based on the energy harvesting operation.

In an exemplary embodiment, the actuator 120 may include any one or more of the following types of actuators: a haptic device that is configured to generate a vibration that is detectable by a user of the RFID card 110; a light-emitting diode (LED) device that is configured to generate an emission of light that is visible to a user of the RFID card 110; a speaker device that is configured to generate an emission of sound that is audible to a user of the RFID card 110; and/or a heater or other type of temperature sensor device that is configured to change a color of a portion of the RFID card 110 that is visible to a user of the RFID card 110. In an exemplary embodiment, the temperature sensor device may include a resistor.

Figure 2:
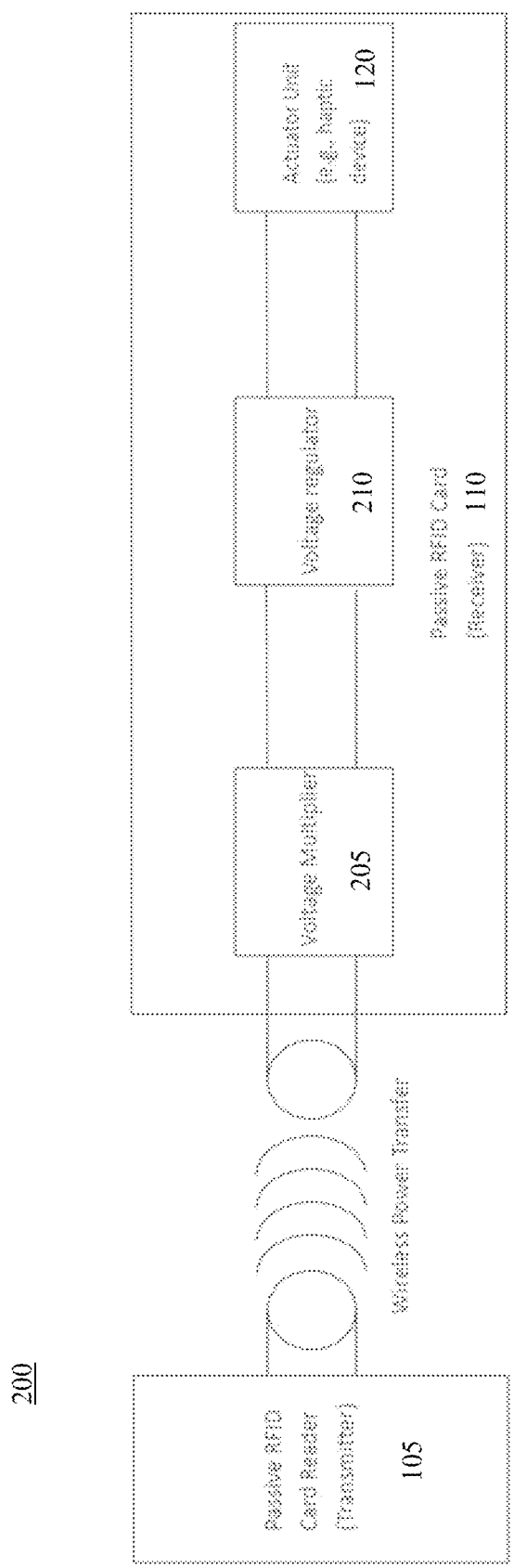
FIG. 2 is a component diagram that illustrates a second approach for implementing a method for obtaining direct feedback from an RFID card by using energy received from a passive RFID card reader, according to an exemplary embodiment.

FIG. 2 is a component diagram 200 that illustrates a second approach for implementing a method for obtaining direct feedback from an RFID card by using energy received from a passive RFID card reader, according to an exemplary embodiment. In an exemplary embodiment, the second approach for implementing a method for obtaining direct feedback from the RFID card 110 by using energy received from the passive RFID card reader 105 entails the use of an actuator 120 that requires a direct current (DC) source, such as an electromechanical actuator. The second approach also entails the use of a voltage multiplier 205, such as, for example, a Cockroft-Walton Voltage Multiplier, that is configured to amplify the voltage to a relatively higher value that may be usable by such an electromechanical actuator 120. In an exemplary embodiment, the RFID card 110 may also include a voltage regulator 210 that is configured to regulate the DC voltage level and power in order to provide stable DC power to the actuator 120.

Figure 3:
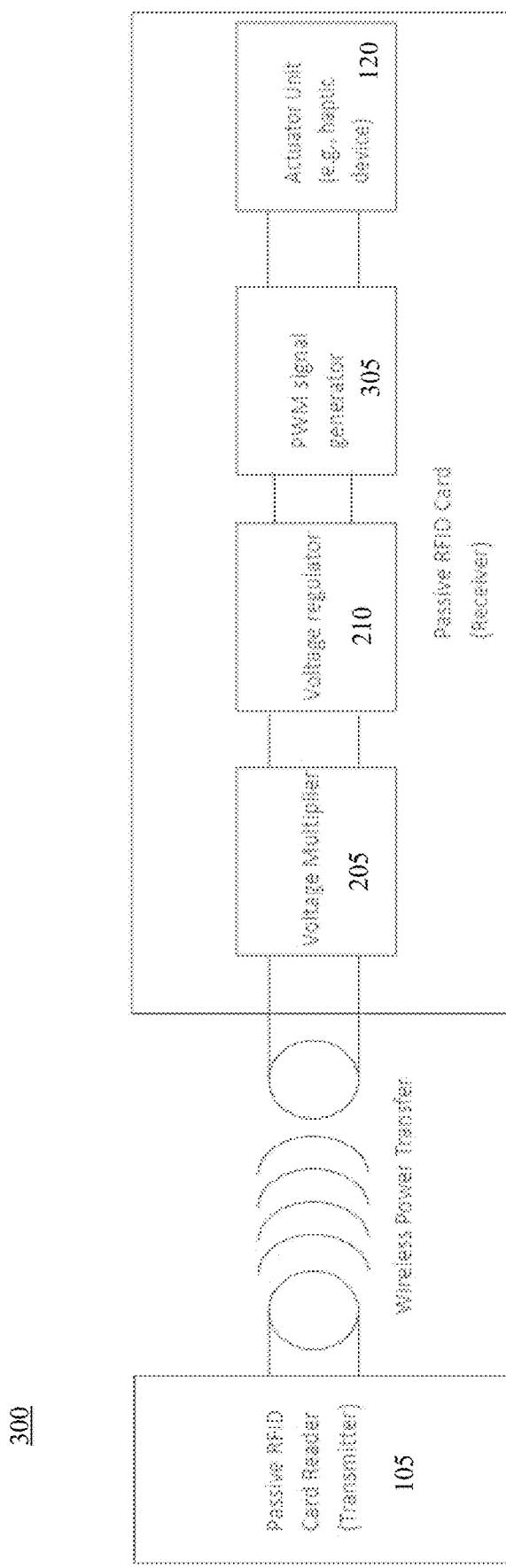
FIG. 3 is a component diagram that illustrates a third approach for implementing a method for obtaining direct feedback from an RFID card by using energy received from a passive RFID card reader, according to an exemplary embodiment.

FIG. 3 is a component diagram 300 that illustrates a third approach for implementing a method for obtaining direct feedback from an RFID card by using energy received from a passive RFID card reader, according to an exemplary embodiment. In an exemplary embodiment, the third approach for implementing a method for obtaining direct feedback from the RFID card 110 by using energy received from the passive RFID card reader 105 entails the use of an actuator 120 that requires an alternating current (AC) source, such as, for example, a linear resonance actuator. The third approach also entails the use of the voltage multiplier 205 and the voltage regulator 210, and further entails the use of a pulse-width modulation (PWM) signal generator 305 that is configured to convert an input DC signal into an AC signal prior to supplying the signal to the linear resonance actuator 120.

In an exemplary embodiment, upon being started, the processor in RFID payment card 110 executes a process for obtaining direct feedback from a passive RFID card by using energy received from a passive RFID card reader. An exemplary process for obtaining direct feedback from a passive RFID card by using energy received from a passive RFID card reader is generally indicated at flowchart 400 in FIG. 4.

Figure 4:
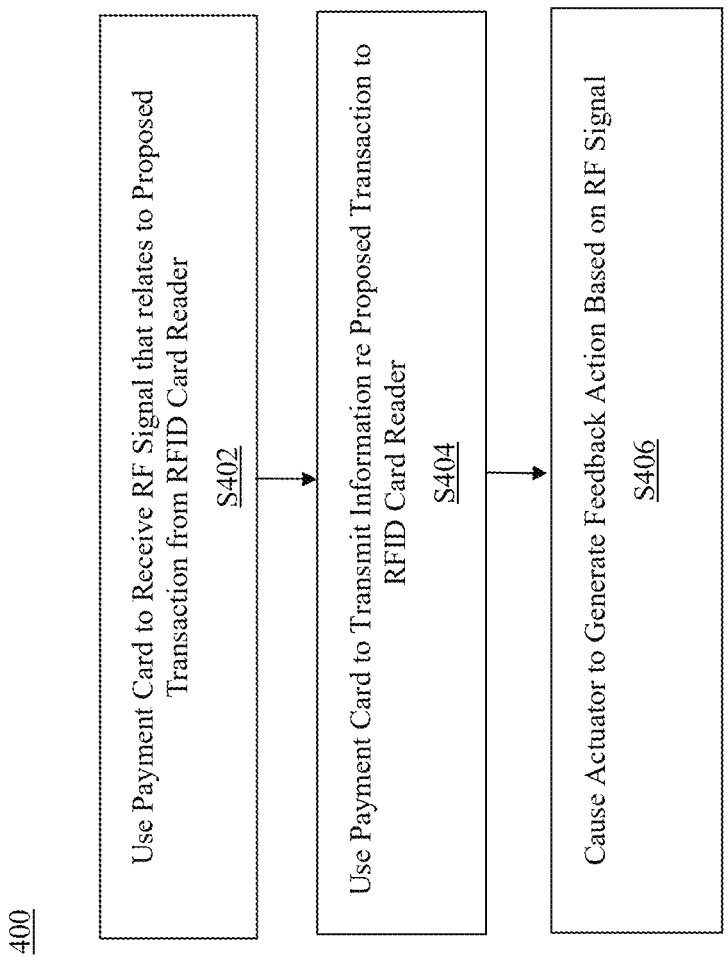
FIG. 4 is a flowchart of an exemplary process for implementing a method for obtaining direct feedback from an RFID card by using energy received from a passive RFID card reader.

In process 400 of FIG. 4, at step S402, the processor in RFID payment card 110 receives a radio frequency (RF) signal that relates to a proposed transaction from passive RFID card reader 105. The RF signal is received via a wireless power transfer between the passive RFID card reader 105 and the RFID payment card 110. In an exemplary embodiment, the process 400 is initiated when a user of the RFID payment card 110 causes an interaction with the passive RFID card reader 105 in order to attempt to execute the proposed transaction, such as a swipe of the RFID payment card 110 through a slot in the passive RFID card reader 105, an insertion of the RFID payment card 110 into a slot in the passive RFID card reader 105, a tap of the RFID payment card 110 upon a screen of the passive RFID card reader 105, or any other suitable operation for causing the interaction. As a result of the interaction, the passive RFID card reader 105 generates the RF signal and then transmits the RF signal to the RFID payment card 110. In this aspect, the RF signal may be understood as relating to the proposed transaction that is desired to be executed by the user of the RFID payment card 110, and thereby gives rise to the interaction between the passive RFID card reader 105 and the RFID payment card 110.

In an exemplary embodiment, energy associated with the reception of the RF signal may be harvested and then stored in a capacitor or other energy storage mechanism that is embedded in the RFID payment card 110. In an exemplary embodiment, because the amount of energy that is transferred by the passive RFID card reader 105 to the RFID payment card 110 may be relatively low, the generated RF signal may have a relatively low amount of power that does not exceed a predetermined threshold, such as, for example, 2000 milliwatts. However, the inventive concept is not limited thereto, and as such, in another embodiment, when a sufficient amount of energy is harvested and directly applicable to the actuator, the amount of power that corresponds to the energy harvesting may be greater than 2000 milliwatts. In this aspect, the amount of power associated with the RF signal may vary based on several factors, such as, for example, a distance between the passive RFID card reader 105 and the RFID payment card 110, a type of the passive RFID card reader 105, and/or any other variable that may affect the amount of the power associated with the RF signal.

At step S404, the processor in RFID payment card 110 transmits account information that relates to the proposed transaction to the passive RFID card reader 105. In an exemplary embodiment, the account information may include a name of an account holder that is associated with the RFID payment card 110; information relating to the account holder, such as a home address, a telephone number, an email address, and any other suitable type of information relating to the account holder; and information that relates to a corresponding account, such as an identification of a financial institution that administers the account and an account number.

At step S406, the processor in payment card 110 causes the actuator 120 to actuate a feedback action based on the first RF signal received in step S402. In an exemplary embodiment, the actuator 120 includes a haptic device that is configured to generate, as the feedback action, a vibration that is detectable by a touch of a user of the payment card.

In an alternative exemplary embodiment, the actuator 120 includes a light-emitting diode (LED) device that is configured to generate, as the feedback action, an emission of light that is visible to the user of the payment card. In yet another exemplary embodiment, the actuator 120 includes a speaker device that is configured to generate, as the feedback action, an emission of sound that is audible to the user of the payment card. In still another exemplary embodiment, the actuator 120 includes a heater and/or a temperature-sensitive actuator device, such as, for example, a resistor, which is configured to generate, as the feedback action, a change of a color of a portion of the payment card that is visible to a user of the payment card.

In an exemplary embodiment, the actuator 120 may be an electromechanical actuator that requires a direct current (DC) source. In this circumstance, as illustrated in FIG. 2, the RFID payment card 110 may further include: a voltage multiplier 205 configured to amplify the signal by a predetermined factor; and a voltage regulator 210 configured to transfer the amplified signal from the voltage multiplier to the actuator 120.

In an alternative exemplary embodiment, the actuator 120 may be a linear resonance actuator that requires an alternating current (AC) source. In this circumstance, as illustrated in FIG. 3, the RFID payment card 110 may further include: a voltage multiplier configured 205 to amplify the signal by a predetermined factor; a voltage regulator 210 configured to receive the amplified signal from the voltage multiplier and to regulate a voltage of the amplified signal; and a pulse-width modulator 305 configured to modulate the amplified and voltage-regulated signal and to transfer the modulated signal to the actuator 120.

Accordingly, with this technology, an optimized process for implementing a method for obtaining direct feedback from an RFID card by using energy received from a passive RFID card reader is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A payment card, comprising:
a processor;
a communication interface coupled to the processor and configured to facilitate wireless communication with a radio frequency identification (RFID) card reader; and
an actuator configured to generate feedback,
wherein the actuator comprises an electromechanical actuator,
wherein the processor is configured to:
receive, from the RFID card reader via the communication interface, a radio frequency (RF) signal that relates to a proposed transaction; and
cause the actuator to actuate a first feedback action based on the RF signal, and
wherein the payment card further comprises:
a voltage multiplier configured to amplify the RF signal by a predetermined factor; and
a voltage regulator configured to transfer the amplified signal from the voltage multiplier to the electromechanical actuator.

2. The payment card of claim 1, wherein the processor is further configured to transmit, to the RFID card reader via the communication interface, account information that relates to the proposed transaction.

3. The payment card of claim 1, wherein the processor is embedded in a power circuit board that includes a capacitor configured to store energy associated with the RF signal that is received from the RFID card reader.

4. The payment card of claim 1, wherein the actuator comprises a haptic device, and wherein the first feedback action comprises a vibration that is detectable by a touch of a user of the payment card.

5. The payment card of claim 1, wherein the actuator comprises a light-emitting diode (LED) device, and wherein the first feedback action comprises an emission of light that is visible to a user of the payment card.

6. The payment card of claim 1, wherein the actuator comprises a speaker device, and wherein the first feedback action comprises an emission of sound that is audible to a user of the payment card.

7. The payment card of claim 1, wherein the actuator comprises a heater, and wherein the first feedback action comprises a change of a color of a portion of the payment card that is visible to a user of the payment card.

8. The payment card of claim 1, wherein the actuator includes a direct current (DC) source.

9. A payment card, comprising:
a processor;
a communication interface coupled to the processor and configured to facilitate wireless communication with a radio frequency identification (RFID) card reader; and
an actuator configured to generate feedback,
wherein the actuator comprises a linear resonance actuator,
wherein the processor is configured to:
receive, from the RFID card reader via the communication interface, a radio frequency (RF) signal that relates to a proposed transaction; and
cause the actuator to actuate a first feedback action based on the RF signal, and wherein the payment card further comprises:
a voltage multiplier configured to amplify the RF signal by a predetermined factor;
a voltage regulator configured to receive the amplified signal from the voltage multiplier and to regulate a voltage of the amplified signal; and
a pulse-width modulator configured to modulate the amplified and voltage-regulated signal and to transfer the modulated signal to the linear resonance actuator.

10. The payment card of claim 9, wherein the actuator includes an alternating current (AC) source.

11. A method for obtaining direct feedback from a payment card, the method being implemented by a processor that is embedded in the payment card, the method comprising:
receiving, from a radio frequency identification (RFID) card reader, a radio frequency (RF) signal that relates to a proposed transaction;
causing an actuator that is embedded in the payment card to actuate a first feedback action based on the RF signal, wherein the actuator comprises an electromechanical actuator;
amplifying, via a voltage multiplier, the RF signal by a predetermined factor; and
transferring, via a voltage regulator, the amplified signal from the voltage multiplier to the electromechanical actuator.

12. The method of claim 11, further comprising transmitting, to the RFID card reader, account information that relates to the proposed transaction.

13. The method of claim 11, wherein the processor is embedded in a power circuit board that is embedded in the payment card and that includes a capacitor configured to store energy associated with the first RF signal that is received from the RFID card reader.

14. The method of claim 11, wherein actuator comprises a haptic device, and wherein the first feedback action comprises a vibration that is detectable by a touch of a user of the payment card.

15. The method of claim 11, wherein the actuator comprises a light-emitting diode (LED) device, and wherein the first feedback action comprises an emission of light that is visible to a user of the payment card.

16. The method of claim 11, wherein the actuator comprises a speaker device, and wherein the first feedback action comprises an emission of sound that is audible to a user of the payment card.

17. The method of claim 11, wherein the actuator comprises a heater, and wherein the first feedback action comprises a change of a color of a portion of the payment card that is visible to a user of the payment card.

\* \* \* \* \*